Figure 3:
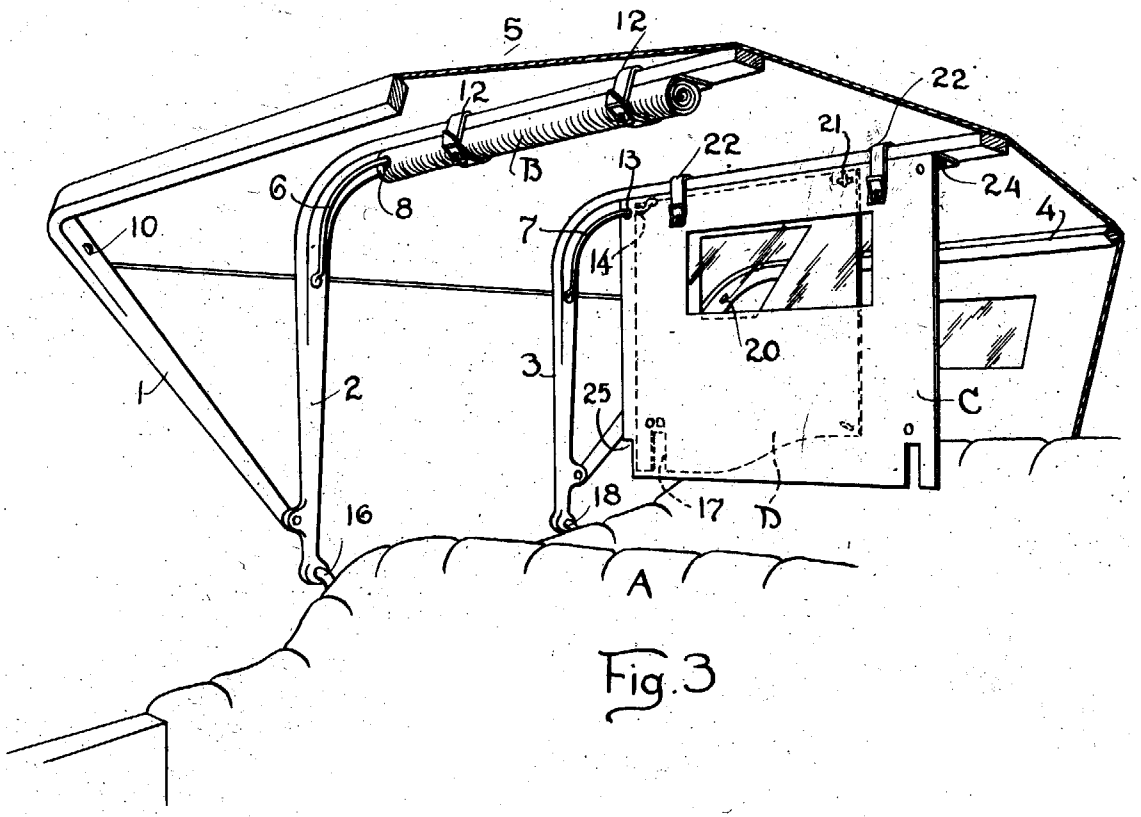

J. N. COLLINS.
CURTAIN MOUNTING FOR VEHICLES.
APPLICATION FILED JAN. 10, 1914.
Reissued Dec. 7, 1915.
14,026.
2 SHEETS—SHEET 1.
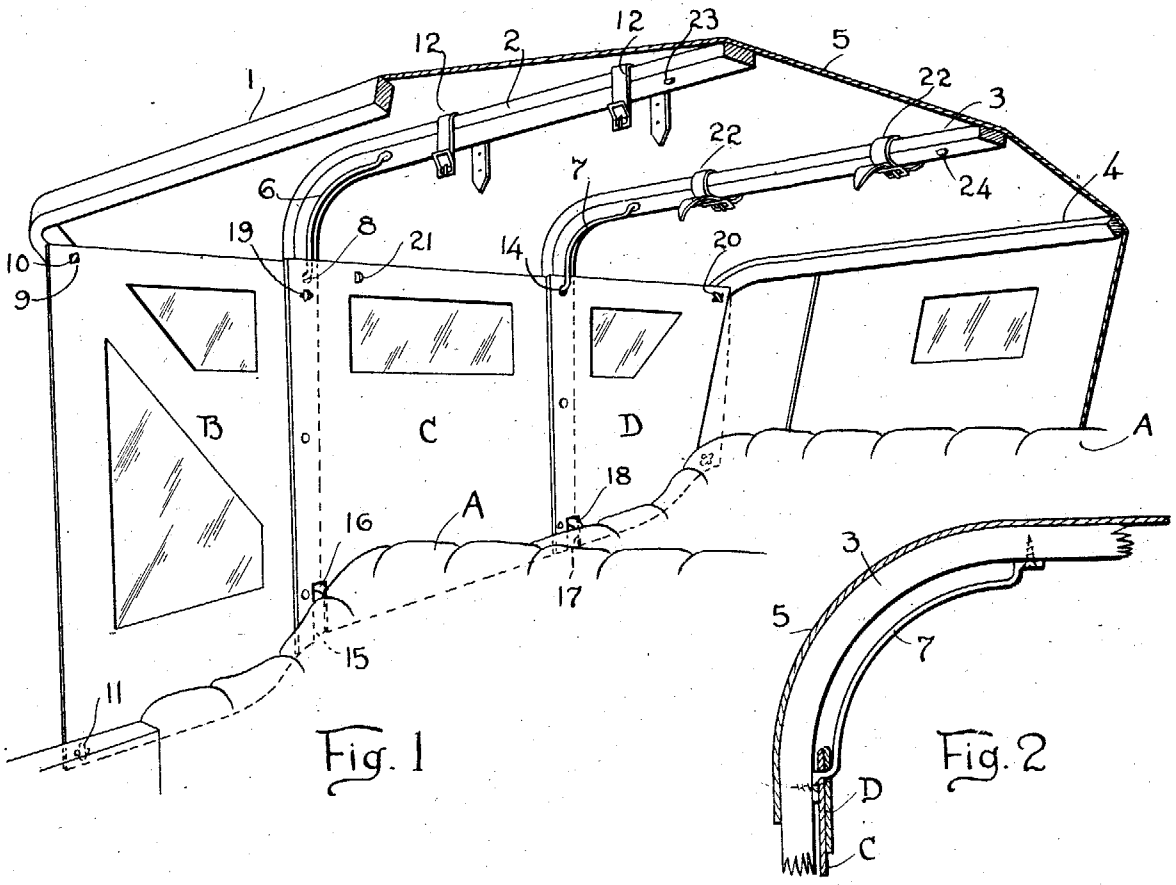
WITNESSES
Robert N. Van Brakeiss
Virginia C. Spratt.
INVENTOR
Jeffrey N. Collins
BY
Raymond A. Parker.
ATTORNEY.

J. N. COLLINS.

CURTAIN MOUNTING FOR VEHICLES.

APPLICATION FILED JAN. 10, 1914.

Reissued Dec. 7, 1915.

14,026.

2 SHEETS—SHEET 2.

WITNESSES

Robert N. Van Dyke Jr.

Virginia C. Spratt.

INVENTOR

Jeffrey N. Collins

BY

Raymond A. Parker.

ATTORNEY.

UNITED STATES PATENT OFFICE.

JEFFREY N. COLLINS, OF JACKSON, MICHIGAN.

CURTAIN-MOUNTING FOR VEHICLES.

14,026. Specification of Reissued Letters Patent. Reissued Dec. 7, 1915.

Original No. 1,066,448, dated July 1, 1913, Serial No. 710,735. Application for reissue filed January 10, 1914. Serial No. 811,493.

*To all whom it may concern:*

Be it known that I, JEFFREY N. COLLINS, a citizen of the United States, residing at Jackson, county of Jackson, State of Michigan, have invented a certain new and useful Improvement in Curtain-Mountings for Vehicles, and declare the following to be a full, clear, and exact description of same, such as will enable others skilled in the art to which it pertains to make and use the same, reference being had to the accompanying drawings, which form a part of this specification.

This invention relates to carriage curtains and has for its object an arrangement of carriage curtains which provides for the convenient stowage of the curtains in an out-of-the-way place when they are not needed for service and which provides a facile way of bringing the curtains into position for use and for fastening them in such position.

In the drawings: Figure 1, is a perspective of the inside of the carriage top, one side being broken away to obtain the view. The curtains are here shown in position for excluding the weather. Fig. 2, is a plan view of the curved portion of the bow, showing the bracket upon which the curtains slide into and out of position. Fig. 3, is a perspective of the inside of the carriage top, showing the manner in which the curtains are stowed away.

A, is the body of the vehicle which is here shown as an automobile.

1, 2, 3, and 4 are the forward, the forward central, the rear central and the rear bows, respectively. The forward bow 1 is pivoted to the forward central bow 2 and the rear bow 4 is pivoted to the central rear bow 3. The fabric 5 covers the tops of the bows extending over the curvatures thereof to form the quarter of the top. This fabric acts as a weather excluder. Each of the central bows is provided with a bracket, the front central bow 2 with the bracket 6 and the rear central bow 3 with the bracket 7. These brackets are located at the curvatures of the bow adjacent the quarter of the top and are intended as track members, upon which the curtains may be slid. The forward curtain B has an eyelet 8 which engages on the bracket 6 and an eyelet 9 that can be secured over the turn-button 10 which is fastened to the side of the forward bow near the point of curvature. The bottom of the curtain B can be fastened to a turn-button 11 on the body of the carriage. When it is desired to stow the curtain away, the eyelet 8 is slid along the bracket 6 and the eyelet 9 fastened to the turn-button 23. The curtain is then rolled up into the position shown in Fig. 3. It is held to the cross bar portion of the bow by the straps 12 or any other convenient fastening means.

The curtain C which is the central curtain has an eyelet 13 which is slidable on the bracket 7, the rear side-curtain D has an eyelet 14, which is slidable also on the bracket 7. The curtain C is slotted at 15 to engage over the bracket 16 which holds the bow 2 to the body of the carriage and cut away at 25 to engage over the bracket 18 that holds the bow 3 to the body of the carriage. Similarly the curtain D is slotted at 17 to engage over the bracket 18. The curtain C can be fastened to the curtain B by a turn-button 21 and the curtain D fastened to the bow 4 by a turn-button 20. Appropriate means may be provided for fastening the bottom of the curtains C and D to the carriage body.

When it is desired to stow the curtains C and D out of the way, they are swung up on the bracket 7 into the position shown in Fig. 3 and the curtain D buttoned to the curtain C by the turn-button 21 that is carried by the curtain C. The curtain C is fastened to the cross bar portion of the bow 3 by the turn-button 24 and then the curtains are rolled up together and strapped to the cross bar of the bow 3 by the straps 22. It will readily be understood that similar curtains can be provided on the opposite side of the carriage and stowed away in the same manner, being strapped to the cross bars by the same straps as are employed with the curtains of the opposite side. The turn-buttons 23 and 24 are located on the cross bar portions of the bows 2 and 3 and are intended to hold the curtains B and C, respectively, (there being a showing of C held in such manner in Fig. 3) while they are being rolled up.

The brackets 6 and 7 each act as a carrying member to transfer the curtain from a point adjacent to the lower edge of the weather excluding fabric to a point higher and farther in on the underside of the top. The curtain is transferred to a point upon the top just beyond the quarter. This brings it directly in front of the occupant of the seat where it can easily be rolled up and also brings it in away from the quarter. This is an advantage inasmuch as the quarter (the side of the top adjacent the curvature of the bows) is very often padded and when the top is collapsed this makes the sides of the top very bulky when the curtains are added to the padded quarter.

What I claim is:

1. In combination with a vehicle top provided with bows and a weather-excluding fabric, a track or bracket located on the bow adjacent the place of curvature, a flexible curtain having a sliding connection at one corner with the bracket or track and provided with a free upper edge, a fastening device for holding the curtain in position for service and for holding the free upper edge of the curtain in proximity with the quarter of the vehicle top, a second fastening device carried on the under side of the vehicle top for holding the curtain, after the curtain has been slid along the track or bracket and swung around transversely of the vehicle, and means for holding the curtain roll to the under side of the top when the curtain has been rolled up, substantially as described.

2. In combination with a vehicle top, provided with bows and a weather-excluding fabric, a bracket or track attached to the bow at the curvature thereof, a flexible curtain having at one corner a sliding connection with the track or bracket and provided with a free upper edge, a button at the side of the top for buttoning the curtain to hug the quarter when in position for service, a second button on the under side of the top for buttoning the curtain thereto when the curtain has been swung around to a position transversely of the top, and straps attached to the top for securing the curtain roll to the under side of the top, substantially as described.

3. In combination with an open side vehicle top provided with bows and weather excluding fabric stretched over the top and down over only the curvatures of the bows to form the quarter, a carrier member supported on the under side of the top adjacent the curvature of the bow, said carrier member functioning through a distance from a point near the bottom edge of the quarter upward there along, a flexible curtain supported at one corner by the carrier member and capable of being transferred by reason of the carrier member from a position near the lower edge of the weather-excluding fabric to a higher position on the under side of the vehicle top, the said curtain being provided with a free upper edge that can be made to hug the quarter closely, a fastening device for holding the curtain in position for service and for holding the free upper edge of the curtain in proximity with the quarter of the vehicle top, a second fastening device carried on the under side of the vehicle top for holding the curtain after the curtain has been transferred to its upper position by the aid of the carrier member and after the curtain has been swung around transversely of the vehicle, and means for holding the curtain to the under side of the top when the curtain has been formed into a package for storing away.

4. The combination with a vehicle top provided with bows and a weather-excluding fabric stretched over the outside of the tops of the bows and down over only the curved portion at the sides of the bows to form the quarter and leave the sides of the vehicle open, of a carrier member located on the inside of the quarter, a curtain constructed to roll from bottom to top and provided with a free and flexible upper edge, the said curtain being connected to the carrier member near one corner, a fastening device located on the inside of the quarter in a position to stretch the free and flexible upper edge of the curtain and to hold the top of the curtain when opened out flat closely to the inside of the quarter, a second fastening device located on the under side of the top and toward the middle thereof in a position to engage the curtain near the opposite top corner and having an adaptability to stretch the top of the curtain crosswise of the vehicle top and, by reason of the action of the carrier member and the location of the second fastening device with respect thereto, adapted to hold the open curtain in a position higher and farther toward the middle of the top, and means for holding the curtain roll to the under side of the top when the curtain has been rolled up.

5. In combination with a vehicle top, a side curtain therefor of flexible material permitting the same to be rolled, means for movably connecting the upper outer corner of the curtain near one side of the top so that the curtain may be turned in its flat state to either operative position longitudinally of the top or inoperative position transversely of the top, means for connecting the opposite upper corner of the curtain to the top when in its transverse position to suspend the same beneath the top, and toward which latter the curtain may then be rolled, means on the top for supporting the curtain in rolled condition, said movable connection between the outer edge of the curtain and the top permitting the curtain to be raised within the top when fastened at its upper corner prior to rolling up the curtain, substantially as described.

In witness whereof, I sign this application in the presence of two witnesses.

JEFFREY N. COLLINS.

Witnesses:
VIRGINIA C. SPRATT,
STUART C. BARNES.